United States Patent [19]

Lesmeister et al.

[11] Patent Number: 4,787,133

[45] Date of Patent: Nov. 29, 1988

[54] METHOD OF ASSEMBLING A REFRIGERATOR DOOR

[75] Inventors: Stephen C. Lesmeister; Thomas E. Jenkins, both of Louisville, Ky.

[73] Assignee: General Electric Company, Louisville, Ky.

[21] Appl. No.: 153,051

[22] Filed: Feb. 8, 1988

Related U.S. Application Data

[62] Division of Ser. No. 60,684, Jun. 11, 1987, Pat. No. 4,747,245.

[51] Int. Cl.[4] ............ B23P 19/04

[52] U.S. Cl. ............ 29/460

[58] Field of Search ............ 29/155 R, 460; 52/309.7, 793, 828; 49/501; 62/116; 312/214; 264/46.5, 46.6, 46.7

[56] References Cited

U.S. PATENT DOCUMENTS

| | | | |
|---|---|---|---|
| 92,205 | 7/1869 | Oertly | 52/793 |
| 1,230,567 | 6/1917 | Comee | 52/828 |
| 1,645,692 | 10/1927 | De Penning | 52/828 X |
| 1,914,646 | 6/1933 | Rand | 52/793 X |
| 2,612,661 | 10/1952 | Sample | 52/793 |
| 2,764,785 | 10/1956 | Sulcek | 52/793 X |
| 3,265,784 | 8/1966 | Jacobs | 264/46.7 X |
| 4,053,972 | 10/1977 | Kordes | 29/460 X |
| 4,270,326 | 6/1981 | Holter et al. | 52/404 |

*Primary Examiner*—Charlie T. Moon
*Attorney, Agent, or Firm*—Frederick P. Weidner; Radford M. Reams

[57] ABSTRACT

A refrigerator door assembly comprising an outer metal rectangular shaped shell having a base panel, four upwardly turned side panels on each side and perpendicular to the base panel, and two sets of two opposite facing inturned flanges, each flange being perpendicular to each of the side panels and having free terminal edges. Two cross braces, each having two legs with each of the legs having at one end a U-shaped channel section having an offset portion terminating with a flat tab, an intermediate section and a flat section at the end opposite the channel section. The flat sections of two legs are rigidly secured to each other to accommodate the desired brace length to diagonally span the door such that the cross braces form an X and the flat tabs of each brace are secured to one set of opposite facing flanges.

6 Claims, 5 Drawing Sheets

METHOD OF ASSEMBLING A REFRIGERATOR DOOR

This is a division of application Ser. No. 60,684, filed 6/11/87, now U.S. Pat. No. 4,747,245.

BACKGROUND OF THE INVENTION

The present invention relates to a refrigerator door assembly and more particularly to a structure and method of assembly that will strengthen the door and keep the door on a flat plane during the foaming operation to thermally insulate the door and later when food and beverage items are stored in the door.

It is common in household refrigerators to have storage provisions in the access doors. As the size of the refrigerator increases the amount of food items carried by the door also increases. Recently the trend has been to provide a deep door wherein bins which carry the food and beverage items on the inside of the door are hung on tracks in the door and these bins are designed to extend outwardly from the door to provide a larger amount of storage space. For economic reasons it is also desirable that the outer metal shell of the door be reduced in thickness and the inner door which is usually made of vacuum formed plastic also be reduced in thickness. Therefore, it is desirable to compensate for the increased weight of the food and beverage items stored on the door and the reduced material thicknesses from which the door is made by providing a rigidifying structure to the door in such a manner that the door will be in a flat plane and not distorted subsequently during the polyurethane foaming operation to thermally insulate the door and later when the door is put into use by loading the door with food and beverage items.

By this invention a refrigerator door assembly, particularly a fresh food compartment door of a refrigerator is strengthened and holds the door in plane during the foaming operation to provide thermal insulation to the door, and subsequently when the door is loaded with food and beverage items.

SUMMARY OF THE INVENTION

A refrigerator door assembly and method of assembly is provided and includes an outer metal rectangular shaped shell having a base panel, four upwardly turned side panels on each side and perpendicular to the base panel and two sets of two opposite facing inturned flanges, each flange being perpendicular to each of the side panels and having free terminal edges. Two cross braces are provided, each having two legs and each of the legs having at one end a U-shaped channel section having an offset portion terminating with a flat tab, an intermediate section and a flat section at the end opposite the channel section. The flat sections of two legs are rigidly secured to each other to accommodate the desired brace length to diagonally span the door such that the cross braces form an X and the flat tabs of each brace are secured to one set of opposite facing flanges.

DESCRIPTION OF THE PREFERRED EMBODIMENT

Figure 1:
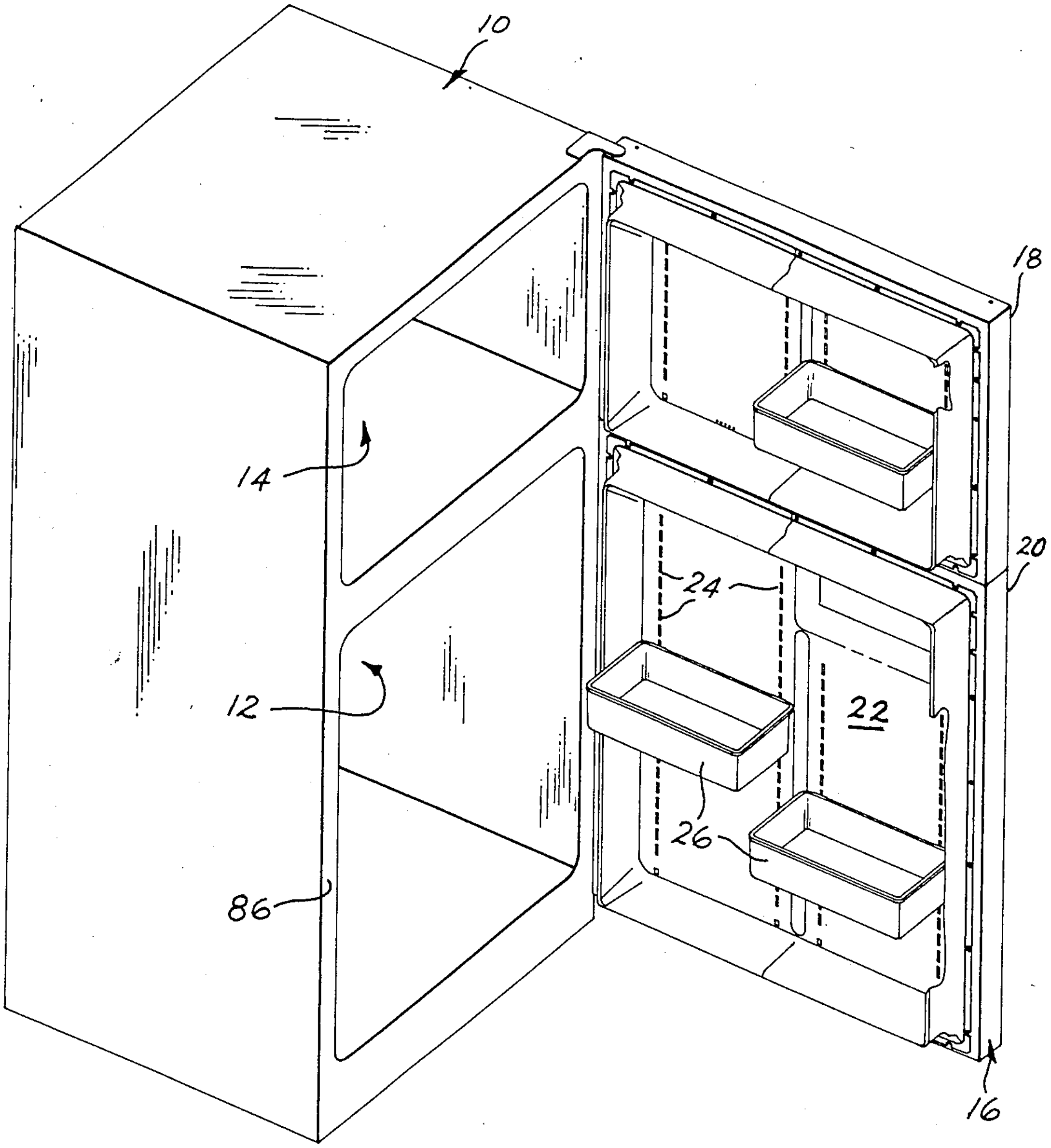
FIG. 1 is a perspective view of a household refrigerator with a freezer compartment on top and a fresh food compartment on the bottom having an access door which incorporates the present invention.

With reference to FIG. 1, there is shown a household refrigerator 10 having a fresh food compartment 12 located in the embodiment shown below a freezer compartment 14 and the fresh food compartment has an access door 16 and the upper freezer compartment has a door 18. The fresh food door 16 has an outer metal rectangular shaped shell 20 and an inner door panel 22 usually formed from plastic material which is secured around the periphery thereof to the outer metal shell 20. The fresh food door 16 and freezer door 18 each have a gasket (not shown) around the periphery of the door which acts to seal the respective compartments from air leakage when each of the doors is closed. The inner door panel 22 has several tracks of vertical slots 24 upon which are hung bins 26 which are for the storage of food and beverage items on the door 16. These bins 26 are movable so that the user of the refrigerator can adjust the bins according to the user's desire. It will be noted that the bins 26 extend outwardly from the inner door panel 22 and may be deep enough to store 6-pack beverages, gallon containers of milk, and other such large items which add considerable weight to be supported by the door 16.

Figure 2:
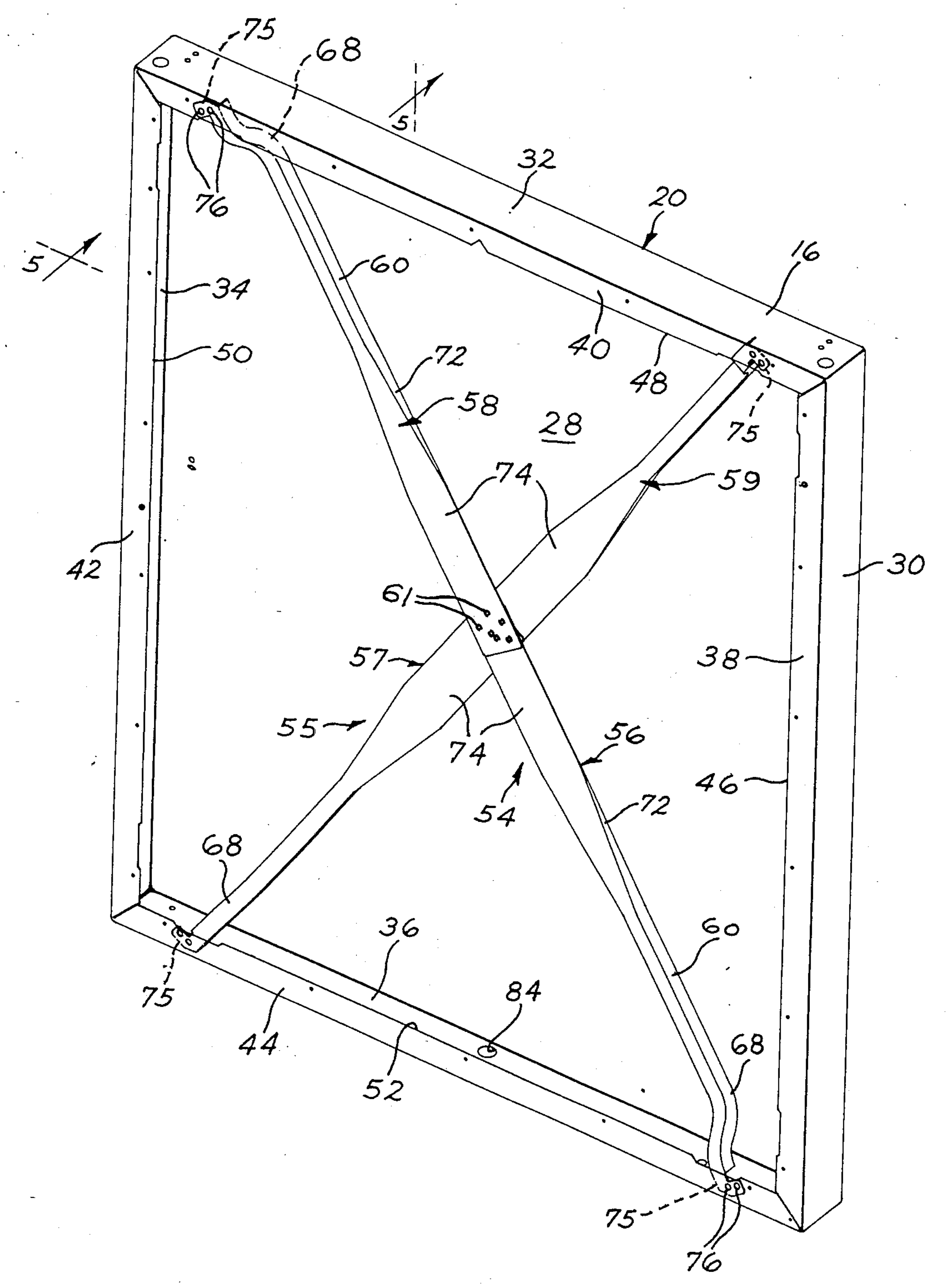
FIG. 2 is the refrigerator door assembly of the present invention showing the cross braces.
Figure 8:
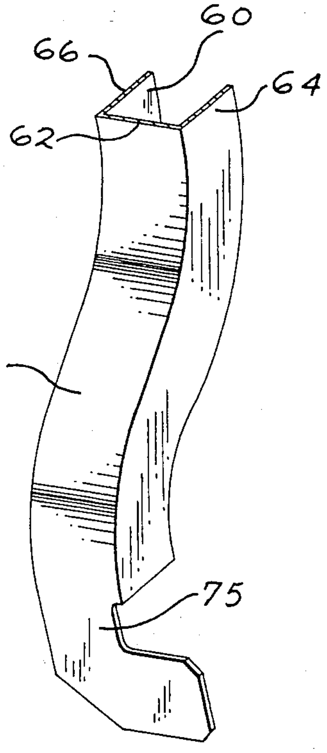
FIG. 8 is a perspective fragmentary view of one end of the cross brace.

With reference to FIG. 2, one embodiment of the refrigerator door assembly of the present invention is shown and includes the outer metal rectangular shaped shell 20 that has a base panel 28, four upwardly turned side panels 30, 32, 34 and 36 on each side and perpendicular to the base panel 28 and two sets of two opposite facing inturned flanges 38, 40, 42, and 44, each flange being perpendicular to each of the side panels 30, 32, 34 and 36 respectively and having free terminal edges 46, 48, 50 and 52 respectively.

Figure 3:
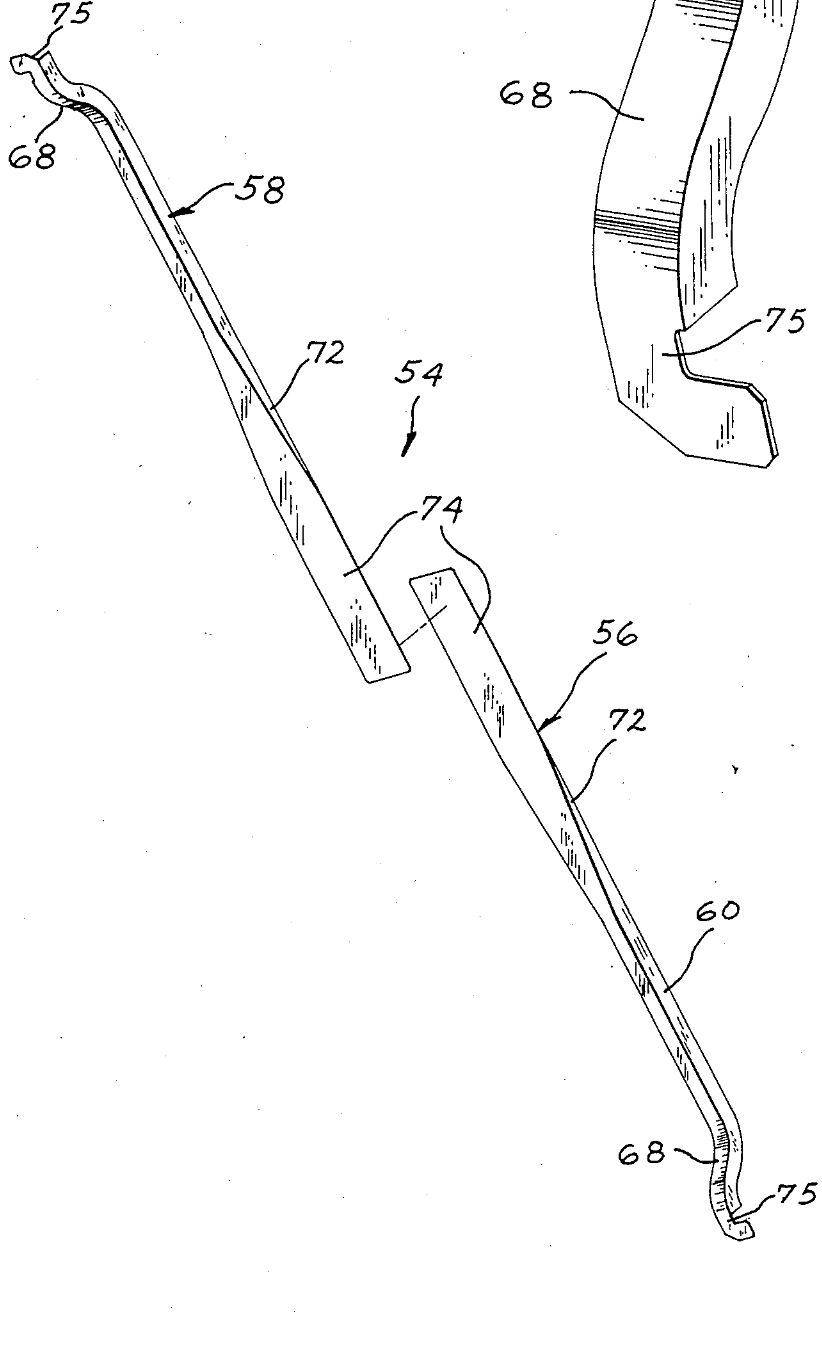
FIG. 3 is the configuration and assembly of one of the cross braces shown in FIG. 2.

The refrigerator door assembly of the present invention includes two metal cross braces 54 and 55 which as shown in FIG. 2 cross each other to form an X and each end of the braces is secured to one set of opposite facing flanges which in the case of the preferred embodiment are flanges 40 and 44. Each cross brace 54 and 55 has two legs 56, 58 and 57, 59 respectively which are joined together to form the braces 54 and 55. With reference to FIG. 3, leg 56, which is made identical to leg 58, has at one end a U-shaped channel section 60 having a bottom wall 62, and two side walls 64 and 66 integral with and depending from the bottom wall 62. The U-shaped channel section has an offset curved portion 68 terminating with a flat tab 75. The leg 56 has an intermediate portion generally shown at 72 and a flat section 74 at the end opposite the channel section 60. The brace 54 is made from the legs 56 and 58 so that the length of the brace may be adjusted depending upon the size of the refrigerator door into which it is to be secured. Since refrigerators come in different sizes, the doors are different sizes and therefore the braces need to be different lengths and can be adjusted by securing the two legs 56 and 58 to each other to accommodate the desired brace length to diagonally span the door. The legs may be joined in any satisfactory manner such as spot welding, metal stitching, etc., indicated as 61 so they are rigidly joined together. The individual metal legs can be stamped on small presses and they can be de-greased without requiring larger carrier trays. Brace 55 is the mirror image of brace 54 and has the same structural arrangement except that tabs 75 face in the opposite direction from tabs 75 of brace 54 as seen in FIG. 2.

Figure 5:
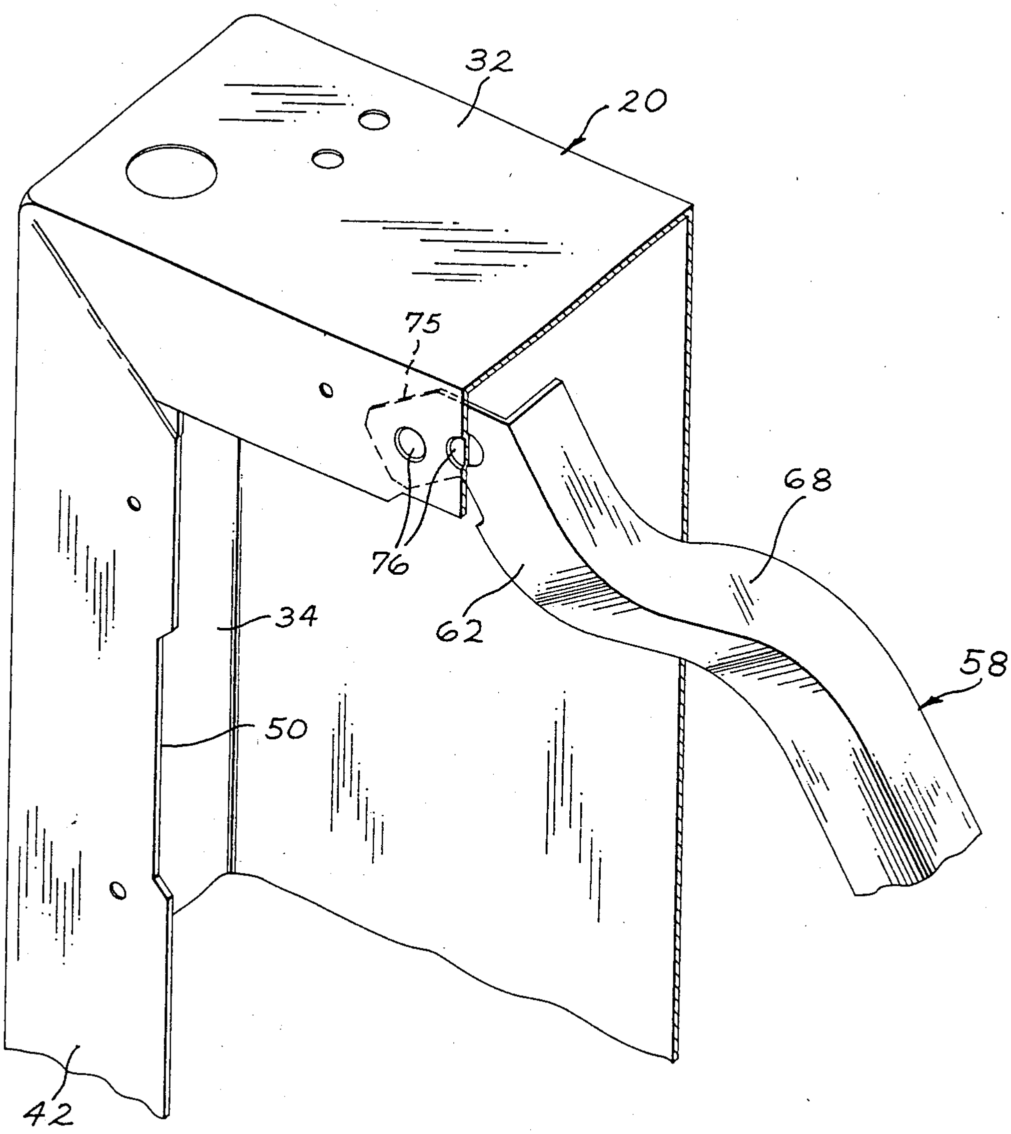
FIG. 5 is an enlarged partial view taken along lines 5—5 of FIG. 2.

After the braces 54 and 55 have been formed as described above, they are placed inside the outer metal shell 20 so that each brace diagonally spans the door and together they form an X as shown in FIG. 2 with the flat tabs 75 at each end of the braces inside the metal shell and abutting the underside of inturned flanges 40 and 44. The outer metal shell 20 is held to assure that the base panel 28 is in a flat plane and when in that condition the flat tabs 75 are secured to the flanges usually by a metal stitching operation. The preferred embodiment of this invention uses a TOG-L-LOC fastener 76, which is well known in the art. One suitable apparatus to form metal stitching such as a TOG-L-LOC fastener is sold by BTM Corporation, Marysville, Mich. A TOG-L-LOC fastener is made from two metal members having a section of each upset one within the other to provide an integral rivet or fastener formation. As shown in the preferred embodiment, the TOG-L-LOC fastening operation is done in two spaced apart locations to form two fasteners on each tab (FIG. 5).

Figure 4:
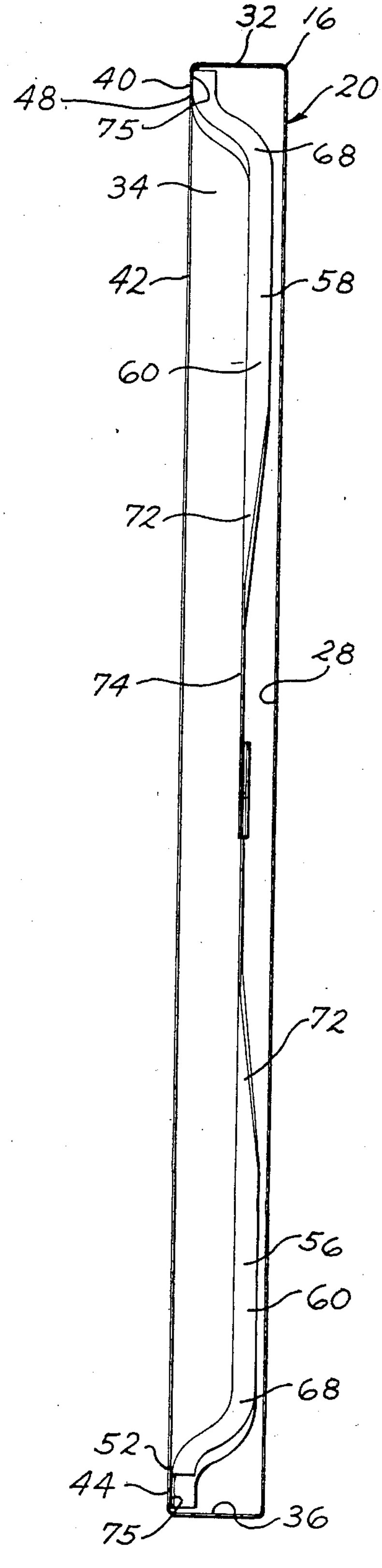
FIG. 4 is a side elevational view of the refrigerator door assembly shown in FIG. 2.
Figure 6:
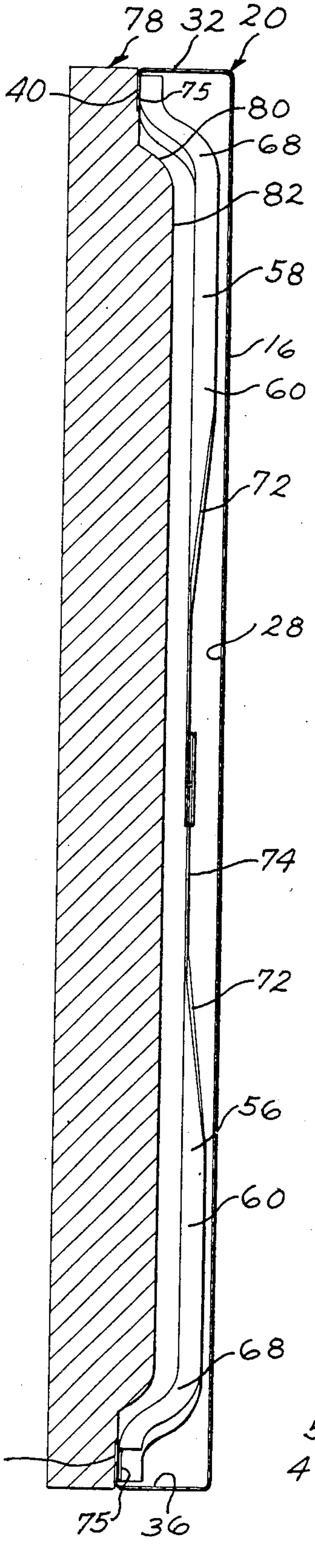
FIG. 6 is a side elevational view showing the refrigerator door assembly of the present invention in a foaming fixture prior to the thermal insulation foaming operation.
Figure 7:
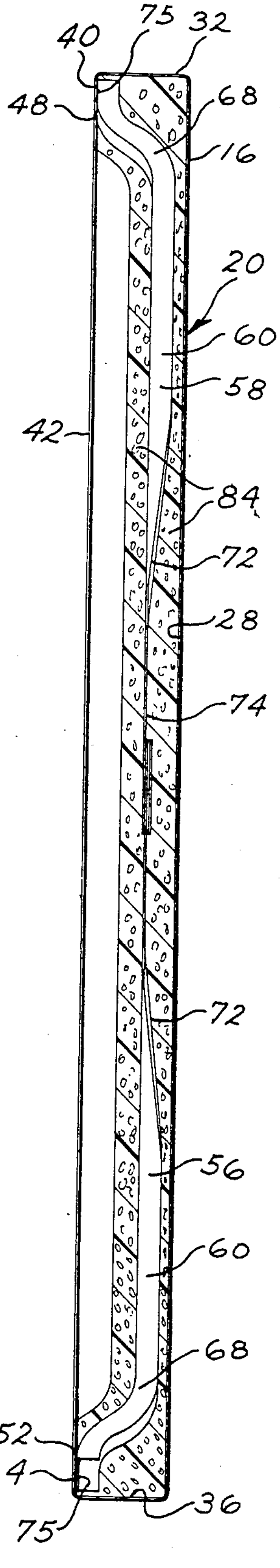
FIG. 7 is a side elevational view of the refrigerator door assembly after the foaming operation and removal of the foaming fixture.

After the refrigerator door assembly as shown in FIG. 2 is completed the door has a side elevational view as shown in FIG. 4. It will be noted from FIG. 4 that the door braces 54 and 55 are spaced above the base panel 28 and because of the offsets 68, the door braces are recessed below the peripheral flanges 38, 40, 42 and 44. Therefore, the height of the offset portion 68 is less than the distance between the base panel and the inturned flanges. The door assembly as shown in FIG. 2 is placed in a fixture for the polyurethane foaming operation to provide thermal insulation of the door and bond the braces to the outer metal shell 20 as shown in FIG. 6. In the foaming operation the base panel 28 is placed on a flat surface and a foam fixture 78 is clamped to the door assembly around the inturned flanges 38, 40, 42 and 44. The fixture 78 has a portion 80 that extends down inside the outer metal shell 20 and is spaced inwardly of the terminal edges 46, 48, 50 and 52 and the lower surface 82 of portion 80 of the fixture 78 is spaced upwardly from the braces 54. The foam fixture 78 is to provide means for retaining the expandable foam resin within the outer metal shell 20 during the foaming operation and then it is removed when the expandable foam resin has cured and solidified. Once the outer metal shell and fixture are in the position shown in FIG. 6, a nozzle (not shown) is inserted through the foam aperture 84 (FIG. 2) which is in the bottom side panel 36 and the polyurethane foamable resin is introduced through the nozzle into the outer metal shell and expands and spreads throughout the entire outer metal shell 20. The shape of the braces 54 and 55 as seen particularly in FIG. 6 permits the foam resin to easily spread through the outer metal shell because the shape of the braces, particularly the flat sections 74, do not obstruct the flow of the foam resin throughout the outer metal shell. Thus, the layer of polyurethane thermal insulation is contiguous with the base panel 28 and encapsulates the braces 54 and 55. The flat sections 74 also distribute the tensile load on the braces over a large area of the foam insulation, thus reducing stress on the foam insulation to prevent movement of the braces relative to the cured foam. After the foaming operation has been completed the nozzle of the foam equipment is removed from the foam aperture 84 and the aperture sealed. With the completion of the foaming operation, the foam resin encapsulates the braces and bonds the braces and outer metal shell together to provide a rigid strong refrigerator door assembly which is in a flat plane and can withstand heavy loads.

After the completion of the foaming operation and removal of the fixture 78 the door assembly has an inner door panel 22 secured by attaching the periphery of the inner door panel to the four inturned flanges 38, 40, 42 and 44 of the metal shell 20. The door 16 then would appear as shown in FIG. 1. To complete assembly of the door, there would be a sealing gasket (not shown) around the periphery of the inner door panel for sealing against the front face 86 of the refrigerator when the door is closed.

While, in accordance with the Patent Statutes, there has been described what at present is considered to be the preferred embodiment of the invention, it will be obvious to those skilled in the art that various changes and modifications may be made thereto without departing from the invention. It is, therefore, intended by the appended claims to cover all such changes and modifications as fall within the true spirit and scope of the invention.

What is claimed is:

1. The method of assembling a refrigerator door comprising:

forming an outer metal rectangular shaped shell having a base panel, four upwardly turned side panels on each side and perpendicular to the base panel and two sets of two opposite facing inturned flanges, each flange being perpendicular to each of the side panels and having free terminal edges;

constructing a cross brace by, forming two legs, each leg having at one end a U-shaped channel section having an offset portion terminating with a flat tab, an intermediate section and a flat section at the end opposite the channel section;

securing the flat section of one leg to the flat section of the other leg such that the length of the brace will accommodate the desired length to diagonally span the door;

positioning two such braces to form an X;

holding the base panel in a flat plane; and securing the flat tabs at the opposite ends of each brace to one set of opposite flanges while the base panel is held in a flat plane.

2. The method of assembling a refrigerator door in accordance with claim 1 further including placing a fixture inside the outer metal rectangular shaped shell and introducing expandable foam resin between the fixture and base panel to encapsulate the braces and bond the braces and outer metal shell together.

3. The method of assembling a refrigerator door in accordance with claim 2 further including forming an inner door panel, removing the fixture from the outer metal rectangular shaped shell and attaching the periphery of the inner door panel to the four inturned flanges.

4. The method of assembling a refrigerator door in accordance with claim 1 wherein the tabs are secured to the flanges by means of metal stitching.

5. The method of assembling a refrigerator door in accordance with claim 4 wherein each tab is secured to the flange by means of two metal stitching fasteners.

6. The method of assembly a refrigerator in accordance with claim 1 wherein the offset portion of each leg of the cross brace is formed to have a height less than the distance between the base panel and the inturned flanges of the outer metal rectangular shaped shell.

* * * * *

UNITED STATES PATENT AND TRADEMARK OFFICE
CERTIFICATE OF CORRECTION

PATENT NO. : 4,787,133

DATED : November 29, 1988

INVENTOR(S) : Stephen C. Lesmeister and Thomas E. Jenkins

It is certified that error appears in the above-identified patent and that said Letters Patent is hereby corrected as shown below:

Claim 1, line 58, after "opposite" insert --facing--.

Claim 6, line 3, delete "assembly" and substitute therefor --assembling--.

Signed and Sealed this

Fourth Day of April, 1989

*Attest:*

DONALD J. QUIGG

*Attesting Officer*

*Commissioner of Patents and Trademarks*